Nov. 23, 1926.

R. E. JONES ET AL 1,607,986

FLUID PRESSURE CONTROL FOR VEHICLES

Filed Jan. 2, 1925    2 Sheets-Sheet 1

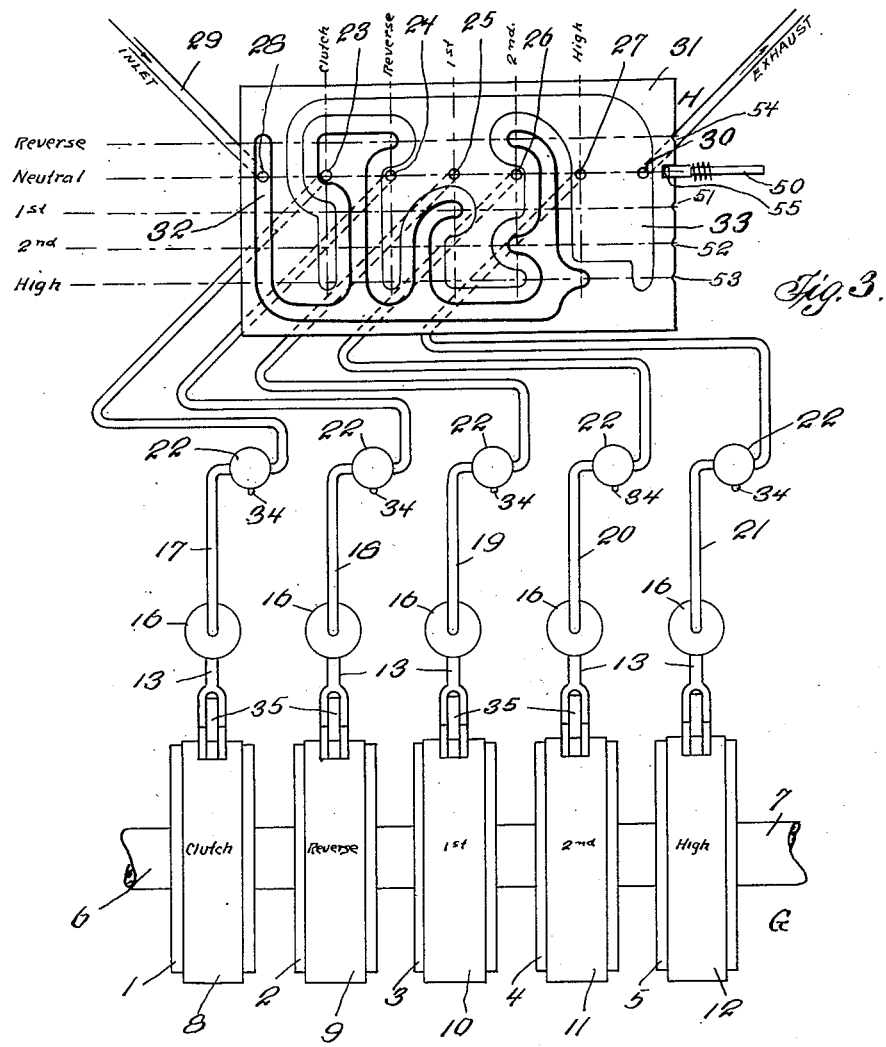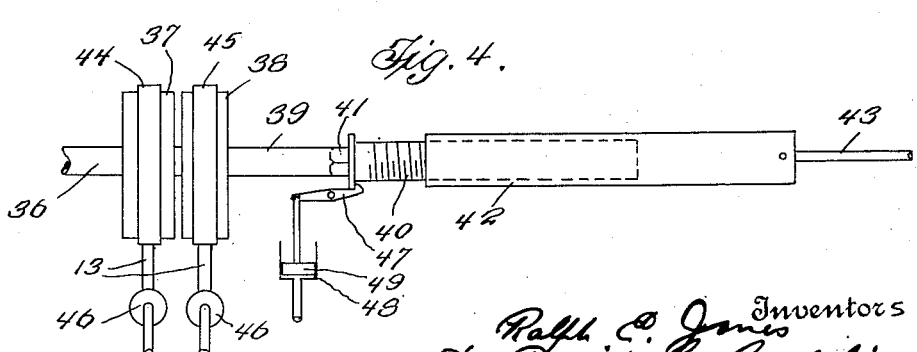

Patented Nov. 23, 1926.

1,607,986

UNITED STATES PATENT OFFICE.

RALPH E. JONES, OF FORT BRADY, MICHIGAN, AND DE WITT C. CONKLING, OF NEW YORK, N. Y.

FLUID-PRESSURE CONTROL FOR VEHICLES.

Application filed January 2, 1925. Serial No. 197.

This invention relates to a fluid pressure control device for automobiles, etc.

An object of the invention is to provide a simple, and efficient mechanism by means of which fluid pressure may be employed to control the driving gear and the various speed changes, as well as the brake mechanism, of a vehicle.

A further object is to provide a suitable valve mechanism and associated parts whereby the driver of the vehicle, by the simple manipulation of a single control valve, will be able selectively to apply or release one or more of the elements required for fully controlling the speed and direction of the vehicle.

A more detailed object is to provide, in combination with a speed changing gear comprising a series of clutches or brake drums the application of which will control the speed and direction of the vehicle, a seperate fluid pressure element associated with each drum, a common control valve manually operable to selectively control said fluid pressure elements, and means automatically operable to regulate the pressure for each of said fluid pressure elements.

Other objects and aims of the invention, more or less specific than those referred to above, will be in part obvious and in part pointed out in the course of the following description of the elements, combinations, arrangements of parts and application of principles, constituting the invention and the scope of protection contemplated will be indicated in the appended claims.

In the accompanying drawings which are to be taken as a part of this specification, and in which I have shown merely a preferred form of embodiment of the invention:—

Figure 3 is a diagrammatical view illustrating a complete system showing the application of this invention to a variable speed gear of the type indicated in Figures one (1) and two (2).

Figure 4 is a diagrammatical view illustrating the application of this invention to a power brake mechanism for vehicles.

Figure 1:
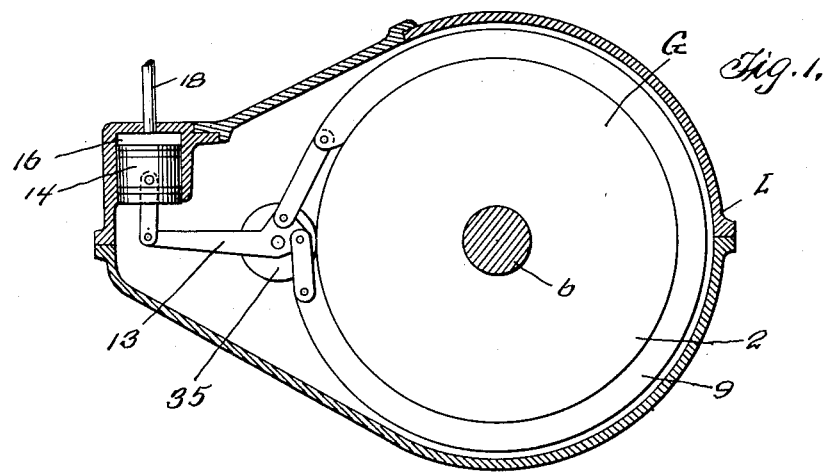
Figure 1 is a vertical transverse sectional view through a typical form of speed changing gear device having a fluid pressure element associated therewith constructed in accordance with this invention.
Figure 2:
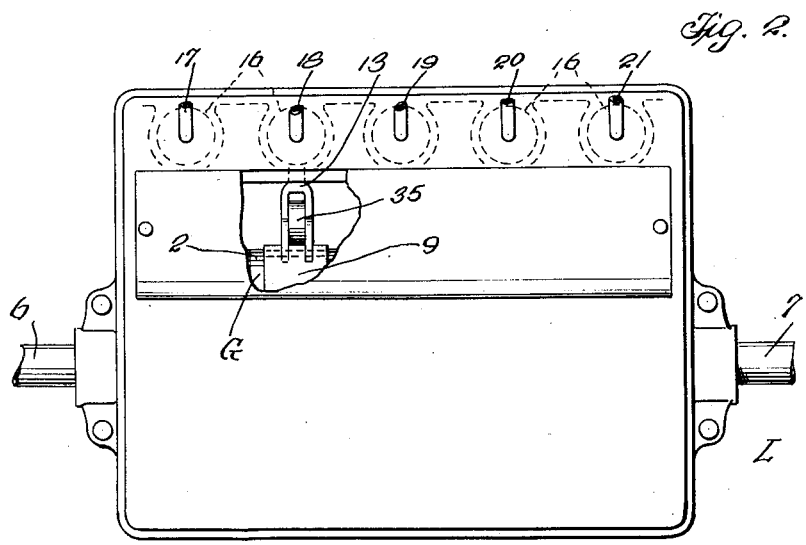
Figure 2 is a top plan view of the structure seen in Figure 1, a part being broken away to better disclose the interior arangement.

Referring to the drawings for describing in detail the structure therein illustrated, the reference character L indicates a casing or housing for enclosing a suitable form of speed changing gear G.

It will be understood that the particular construction of the speed changing gear G is of no pertinence herein except in that it contains a series of separate elements, as the drums 1, 2, 3, 4, and 5 and that by selectively allowing or hindering the rotation of these the speed and direction of the vehicle will be altered accordingly.

In the instance illustrated the engine shaft 6 enters the casing L at one end of the casing and the driven shaft 7 extends from the opposite end of the casing.

The rotation of the shaft 6 will be transmitted to the shaft 7 under the selective control of the drums 1, 2, 3, 4 and 5, and in a manner which will be well understood by those skilled in the art.

The drums 1, 2, 3, 4, and 5 are provided with brake devices or bands as 8, 9, 10, 11 and 12 respectively. The free ends of these bands are connected with levers 13, there being one lever for each band. Swinging movement of the levers will cause the bands to engage or disengage their respective drums according to the direction of movement of the levers.

Connected with each lever is a piston 14, and each of these pistons moves within a separate cylinder 16.

Pipe lines 17, 18, 19, 20 and 21 extend from the several cylinders 16 to the manually operable valve H, and in each of these pipe lines is connected a pressure regulating device 22.

The valve H may be arranged to any appropriate locality but is preferably placed at a convenient point for easy manipulation by the driver of the vehicle.

The pipe lines 17, 18, 19, 20 and 21 enter the valve by means of ports 23, 24, 25, 26 and 27 respectively.

An inlet port as 28, connected with the inlet pipe 29, is provided, and an outlet or exhaust port as 30 is likewise provided.

All of these ports have a relatively fixed position in the valve and with respect to each other.

The moving element of the valve is indicated by the reference character 31 and it is intended that the movement of this movable member shall selectively place the inlet and exhaust ports of the valve in such communication with the other ports as to cause the application or release of one or more of the bands 8, 9, 10, 11, and 12 as may be required to produce the desired kind of movement of the shaft 7.

The valve in practice may take any desired form. In the diagrammatical illustration Fig. 3 it is shown simply as a flat plate which is movable vertically into five different positions as indicated by the five horizontal lines labelled "Reverse", "Neutral", "1st", "2nd" and "High" on the drawing.

Also acording to the drawing, the first drum, as 1, is labelled "Clutch" and the valve port 23 into which its pipe line 17 connects is likewise labelled "Clutch".

The second drum, as 2, is labelled "Reverse", and the valve port into which its pipe line 18 communicates is likewise labelled "Reverse".

The drum 3, is labelled "1st" and the valve port into which the pipe line 19 thereof communicates is likewise labelled "1st".

The drum 4, is labelled "2nd", and the valve port with which the pipe line 20 thereof communicates is likewise labelled "2nd".

The fifth drum is labelled "High" and the valve port with which the pipe line 21 thereof communicates is likewise labelled "High".

In the movable valve member 31, as shown in Fig. 3, the inlet port 28 commnunicates, in all positions of said valve member, with a passage way 32, which for convenience will be herein referred to as the "inlet passage" the contour thereof is indicated by relatively heavy lines. The exhaust port 30 communicates with a passage 33 which for convenience herein will be called the "exhaust passage" and is shown by relatively lighter lines.

The movable valve member is shown as being in "neutral" position and it will be noted that in this position the fluid pressure entering through the port 28 passes only through the "clutch" port 23 of the pipe line 17 to the cylinder of the clutch drum 1. All of the other ports are open to exhaust, and in this position of the device the presence of pressure within the cylinder of the "clutch" drum will enable free rotation of the engine shaft 6 without imparting movement to the shaft 7.

If now the movable member 31 of the valve be moved upwardly one step, that is to a position wherein the horizontal line labelled "1st" comes into register with the row of ports, the "clutch" port 23 will be opened to exhaust and the first speed port 25 will be placed in communication with the inlet passage 32. The other ports will remain at exhaust, and the application of pressure in the cylinder of the first speed drum 3 will cause the shaft 7 to rotate at so called first speed with respect to the shaft 6.

If the member 31 be moved another step upwardly, that is to bring the horizontal line labelled "2nd" into register with the line of ports, the first speed port 25 will be opened to exhaust and the 2nd speed port 26 will be placed in communication with the passage 32. The pressure thus supplied to the cylinder of the 2nd speed drum will cause the shaft 7 to rotate at so called 2nd speed with respect to the shaft 6.

If the member 31 be moved a final step upwardly to bring the horizontal line labelled "High" into register with the row of ports, the 2nd speed port 26 will be opened to exhaust and the high speed port 27 will be placed in communication with the inlet passage 32 and the pressure thus exerted in the cylinder of the high speed drum 5 will cause the shaft 7 to rotate at its maximum speed.

On the other hand, if at any time the member 31 of the valve is moved downwardly, to bring the horizontal line labelled "Reverse" into register with the row of ports, the clutch port 23, the reverse port 24, and the 2nd speed port 26 will be placed in communication with the passage 32 to admit pressure into the cylinders of the "clutch reverse", and 2nd speed drums, the remaining ports being at exhaust and under these conditions the shaft 7 will rotate in a direction opposite to the direction of rotation of the shaft 6.

It will be understood that the particular selection of ports as above mentioned, or their sequential arrangement, may be altered to meet varied requirements particularly as to the construction and manner of operation of the parts of the speed changing gear with which the invention is associated.

By means of the presence of the automatic pressure control device 22 in each of the pipe lines employed the amount of pressure delivered into the respective cylinders may be altered according to the adjusted position to which each of the pressure regulators is set.

These pressure regulators may be of any approved type or construction but are preferably of the kind shown and described in patent to R. E. Jones, No. 1,528,297, March 3, 1925, and which included the manually movable handle element as 34, by which the pressure delivered through said regulators may be positively determined in any desired amount.

The pressure entering the system by means of the inlet pipe 29 may be constant and may be derived from in suitable sources, as from a suitable air pressure reservoir carried by the vehicle and maintained by a suitable pressure mechanism operated from the vehicle engine. This constant pressure may be fed into any selected one of the pipe lines described and the automatic regulators in said lines will determine the effect upon the pistons in the cylinders of said lines.

In the drawings 1 and 2, the levers 13 are shown as carrying each a roller 35 arranged to engage against the surface of the drum and serve as a centering device which will enable a smooth and easy operation of the pistons 14.

In the modification Fig. 4, this invention is shown in association with a power brake mechanism. The mechanism shown includes a drive shaft as 36, to which is connected two drums, 37 and 38 a driven shaft 39. A threaded sleeve 40 is longitudinally movable along a squared portion 41 of the shaft 39 and in turn engages within a threaded sleeve 42 to which a brake rod 43 is attached. The shaft 39 and screw sleeve 40 rotate in one direction or the other according to which of the drums 37 or 38 is held against rotation. Bands as 44 and 45 are carried by the drums respectively and each is connected to be controlled by a suitable piston and cylinder 46 after the manner already described as to the previous figures.

A suitable latch as 47 is provided for building the sleeve 40 against movement, longitudinal along the shaft 39, and a cylinder 48, with piston 49, is arranged to operate this latch.

The purpose of the latch as 47 is to permit emergency release of the brake rod upon occasion.

A suitable form of valve, corresponding in principle to the valve above described, may be employed to selectively control the passage of fluid pressure into the cylinders 46—48 for thereby determining the operation of the mechanism.

It is apparent that a speed changing gear, or a brake mechanism, of a vehicle, may by means of this invention be readily and efficiently controlled by the simple operation of a single valve, and that thus the objectionable rods and levers usually found projecting through the floor boards of an automobile may be entirely eliminated.

As suggested in Fig. 3 of the drawings it is a feature of this invention to provide a means by which to prevent the operator from suddenly moving the valve into "reverse" position accidentally. This means may take any desired form but as diagrammatically illustrated in the drawings it consists of a spring latch 50 arranged to bear against the right hand edge of the valve plate 31. The plate is provided with a series of shallow notches as 51, 52 and 53 corresponding with the "1st", "2nd" and "high" positions of the plate, a fourth shallow notch 54 corresponding to the "reverse" position, and a relatively deep notch 55 corresponding to the "neutral" position of the plate when the plate is in "neutral" position, and the latch 50 is in engagement within the notch 55 the plate is positively held against movement until the latch is manually withdrawn from the notch. The notches 51, 52, 53 and 54 serve merely to receive the nose of the latch for denoting the different positions of the plate.

By this, or similar, means the driver of the vehicle will be able to freely move the valve plate from one notch to the other within the limits of the "1st", "2nd", and "high" speed positions without likelihood of accidentally moving said plate to "reverse" position, since in moving across the "neutral" position the latch 50 will drop into locking position and hold the plate against movement to "reverse".

As many changes could be made in this construction without departing from the scope of the invention as defined in the following claims, it is intended that all matter contained in the above description or shown in the accompanying drawings, shall be interpreted as illustrative only and not in a limiting sense.

Having thus described our invention, what we claim as new and desire to secure by Letters Patent is:—

1. In a fluid pressure control for vehicles, the combination with a speed changing gear having independently controllable parts to determine the speed transmitted from a drive shaft to a driven shaft, of separate fluid pressure controlled parts to operate said independently controllable parts, respectively, and a single valve mechanism by which to selectively determine the operation of said fluid pressure controlled parts.

2. In a fluid pressure control for vehicles, the combination with a vehicle controlling element having a plurality of parts independently operable to selectively control the vehicle, of a plurality of separate fluid pressure controlled elements one for each of said independently operable parts, said fluid pressure controlled elements being connected respectively with said independently operable parts to operate said parts, and a single valve device by which to selectively operate said fluid pressure controlled elements.

3. In a fluid pressure control for vehicles, the combination with a vehicle controlling element having a plurality of parts independently operable to selectively control the vehicle, of a plurality of separate fluid pressure controlled elements one for each of said independently operable parts, said fluid pressure controlled elements being connected respectively with said independently operable parts to operate said parts, a source of fluid pressure supply, a single valve device by which to selectively connect said source with said fluid presure controlled elements, and a pressure regulator adjustable to alter the amount of pressure delivered to each of said fluid pressure controlled elements.

4. In a fluid pressure control for vehicles, the combination with a vehicle controlling element having a plurality of parts independently operable to selectively control the movements of the vehicle, of a plurality of separate fluid pressure controlled elements one for each of said independently operable parts, said fluid pressure controlled elements being connected with said independently operable parts respectively to operate said parts, a source of fluid pressure supply, a single valve device by which to selectively connect said source with said fluid pressure controlled elements, pipe lines extending one from each of said fluid pressure controlled elements to said valve device, and pressure regulators arranged one in each of said pipe lines.

5. In a fluid pressure control for vehicles, the combination with a vehicle controlling element comprising a plurality of rotating drums, brake devices one for engaging each of said drums, separate fluid pressure controlled elements one connected with each of said brake devices respectively, and a single valve device by which to selectively operate said fluid pressure controlled elements.

6. In a fluid pressure control for vehicles, the combination with a vehicle controlling element comprising a plurality of rotating drums, brake devices one for engaging each of said drums, separate fluid pressure controlled elements one for each of said brake devices, each of said fluid pressure controlled elements comprising a piston, a cylinder within which said piston is slidably mounted, and a lever connecting between the piston and its respective brake device, a source of fluid pressure supply for operating said fluid pressure controlled elements, and a single valve device for connecting said supply with the cylinders of said fluid pressure controlled elements selectively at will.

7. In a fluid pressure control for vehicles, the combination with a power brake mechanism having independently controllable parts to determine the position of the vehicle brakes, of separate fluid pressure controlled elements to operate said independently controllable parts, respectively, a source of supply for the fluid pressure controlled elements, and a valve device for connecting said source with said fluid pressure controlled elements selectively at will.

8. In a fluid pressure control for vehicles, the combination with a vehicle controlling element having a plurality of parts independently operable to selectively control the vehicle, of a plurality of separate fluid pressure controlled elements one for each of said independently operable parts, said fluid pressure controlled elements being connected respectively with said independently operable parts to operate said parts, a single valve device by which to selectively operate said fluid pressure controlled elements, said valve device including a part manually movable to selected positions in opposite directions from a neutral position, and means to releasably retain said part in its neutral or in any selected position into which it is moved but the means to retain said part in neutral position being relatively more effective than the means to retain said part in its other positions.

In testimony whereof we affix our signatures.

RALPH E. JONES.
DE WITT C. CONKLING.